(12) United States Patent
Sakuma et al.

(10) Patent No.: US 10,907,523 B2
(45) Date of Patent: Feb. 2, 2021

(54) ABNORMALITY DIAGNOSIS APPARATUS

(71) Applicant: TOYOTA JIDOSHA KABUSHIKI KAISHA, Aichi-ken (JP)

(72) Inventors: Tetsuya Sakuma, Gotemba (JP); Keishi Takada, Kanagawa-ken (JP); Hiromasa Nishioka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 149 days.

(21) Appl. No.: 16/299,036

(22) Filed: Mar. 11, 2019

(65) Prior Publication Data

US 2019/0277181 A1    Sep. 12, 2019

(30) Foreign Application Priority Data

Mar. 12, 2018    (JP) .................................. 2018-043991

(51) Int. Cl.

| | |
|---|---|
| *F01N 11/00* | (2006.01) |
| *B01D 53/94* | (2006.01) |
| *F01N 3/20* | (2006.01) |
| *F02B 77/08* | (2006.01) |
| *F01N 3/00* | (2006.01) |

(52) U.S. Cl.
CPC .......... *F01N 11/00* (2013.01); *B01D 53/9431* (2013.01); *B01D 53/9495* (2013.01); *F01N 3/00* (2013.01); *F01N 3/208* (2013.01); *F02B 77/08* (2013.01); *F01N 2550/02* (2013.01); *F01N 2560/12* (2013.01); *F01N 2610/02* (2013.01); *F01N 2900/1622* (2013.01)

(58) Field of Classification Search
CPC . F01N 11/00; F01N 3/00; F01N 3/208; F01N 2560/12; F01N 2900/1622; F01N 2610/02; F01N 2550/02; F01N 3/2066; F01N 11/002; B01D 53/9431; B01D 53/9495; F02B 77/08; Y02T 10/12
See application file for complete search history.

(56) References Cited

U.S. PATENT DOCUMENTS

| | | | |
|---|---|---|---|
| 6,833,272 B1 * | 12/2004 | Binder ............... | B01D 53/8631 436/37 |
| 8,210,033 B2 * | 7/2012 | Kondo .................... | F01N 9/002 73/114.69 |
| 8,384,397 B2 * | 2/2013 | Bromberg ............. | F01N 13/009 324/636 |

(Continued)

FOREIGN PATENT DOCUMENTS

JP    2009-127496 A    6/2009

*Primary Examiner* — Freddie Kirkland, III
(74) *Attorney, Agent, or Firm* — Hauptman Ham, LLP (57) ABSTRACT

An abnormality diagnosis apparatus includes an irradiation device to detect a resonance frequency by irradiating an electromagnetic wave to the NOx catalyst, and a controller to diagnose based on the resonance frequency whether the NOx catalyst is abnormal, wherein the NOx catalyst is arranged in such a position that an electric field strength inside the NOx catalyst at the time when the irradiation device irradiates the electromagnetic wave of the resonance frequency becomes larger in an upstream portion of the NOx catalyst, which is at the upstream side of a center of the NOx catalyst in the direction of flow of exhaust gas, than in a downstream portion of the NOx catalyst, which is at the downstream side of the center of the NOx catalyst.

4 Claims, 6 Drawing Sheets

(56) References Cited

U.S. PATENT DOCUMENTS

| | | | | |
|---|---|---|---|---|
| 9,745,909 B2* | 8/2017 | Kubinski | ............ | F02D 41/1477 |
| 10,260,400 B2* | 4/2019 | Sappok | ................ | H04W 24/08 |
| 2014/0283503 A1* | 9/2014 | Roesch | ................... | F01N 11/00 |
| | | | | 60/274 |
| 2016/0333760 A1* | 11/2016 | Blomgren | ............... | F01N 3/208 |
| 2017/0211453 A1* | 7/2017 | Sappok | ................ | H04B 17/18 |
| 2019/0284980 A1* | 9/2019 | Sakuma | ................. | F01N 11/00 |

* cited by examiner

ABNORMALITY DIAGNOSIS APPARATUS

CROSS REFERENCE TO RELATED APPLICATION

This application claims the benefit of Japanese Patent Application No. 2018-043991, filed on Mar. 12, 2018, which is hereby incorporated by reference herein in its entirety.

BACKGROUND

Technical Field

The present disclosure relates to an abnormality diagnosis apparatus.

Description of the Related Art

There has been known an NOx selective catalytic reduction catalyst (hereinafter, sometimes referred to simply as an "NOx catalyst") which purifies (removes or reduces) NOx contained in an exhaust gas from an internal combustion engine by using ammonia as a reducing agent. The NOx reduction rate of this NOx catalyst becomes lower with the progress of deterioration, so a diagnosis of whether the degree of deterioration of the NOx catalyst has exceeded an allowable range is carried out in a vehicle mounted state (on board). Here, note that the diagnosis of whether the degree of deterioration of the NOx catalyst has exceeded the allowable range is hereinafter referred to as an abnormality diagnosis. For example, the abnormality diagnosis of the NOx catalyst can be carried out, by focusing on the fact that the ammonia adsorption performance of the NOx catalyst becomes lower with the progress of deterioration of the NOx catalyst. In patent literature 1, there is described a technique in which ammonia is supplied to an NOx catalyst to such an extent as to slip from the NOx catalyst, and when ammonia slips from the NOx catalyst, it is judged that an amount of ammonia adsorbed in the NOx catalyst reaches an upper limit, so that the abnormality diagnosis of the NOx catalyst is carried out based on the amount of adsorbed ammonia at this time. In this technique, the amount of adsorbed ammonia is calculated from the amount of ammonia supplied, and when this amount of adsorbed ammonia is equal to or less than a threshold value, it is diagnosed that the NOx catalyst has deteriorated.

CITATION LIST

Patent Literature

Patent Literature 1: Japanese patent application laid-open publication No. 2009-127496

SUMMARY

In the technique according to the patent literature 1, it is necessary to supply ammonia until the ammonia slips from the NOx catalyst, and hence, there is a fear that the ammonia having slipped from the NOx catalyst may be released into the atmosphere.

The present disclosure has been made in view of the problems as mentioned above, and has for its object to carry out an abnormality diagnosis of an NOx catalyst, while suppressing ammonia from flowing out of the NOx catalyst.

Solution to Problem

In order to achieve the above-mentioned object, the present disclosure resides in an abnormality diagnosis apparatus for an NOx selective catalytic reduction catalyst, which is arranged in an exhaust passage of an internal combustion engine and selectively reduces NOx by using ammonia, said apparatus comprising; an irradiation device configured to detect a resonance frequency by irradiating an electromagnetic wave to said NOx selective catalytic reduction catalyst; and a controller configured to diagnose based on said resonance frequency whether said NOx selective catalytic reduction catalyst is abnormal; wherein said NOx selective catalytic reduction catalyst is arranged in such a position that an electric field strength inside said NOx selective catalytic reduction catalyst at the time when said irradiation device irradiates the electromagnetic wave of a resonance frequency becomes larger in an upstream portion of said NOx selective catalytic reduction catalyst, which is at the upstream side of a center of said NOx selective catalytic reduction catalyst in the direction of flow of exhaust gas than in a downstream portion of said NOx selective catalytic reduction catalyst, which is at the downstream side of the center of said NOx selective catalytic reduction catalyst.

In the NOx catalyst, ammonia is adsorbed at acid sites, but when deterioration of the NOx catalyst progresses, these acid sites decrease, so an amount of ammonia able to be adsorbed by the NOx catalyst decreases. Here, the resonance frequency when the electromagnetic wave is irradiated from the irradiation device is in correlation with the amount of ammonia adsorbed to the NOx catalyst. When the acid sites decrease with the progress of deterioration of the NOx catalyst, the ammonia adsorbed in the NOx catalyst decreases to change the resonance frequency, so a decrease in the acid sites of the NOx catalyst can be detected based on the resonance frequency.

When the electromagnetic wave is irradiated to the NOx catalyst, the ammonia detection sensitivity becomes the highest in locations (antinodes) in which the electric field strength becomes the largest, whereas the ammonia detection sensitivity becomes the lowest in locations (nodes) in which the electric field strength becomes the lowest. That is, the resonance frequency detected is affected by the influence of the amount of adsorbed ammonia in the surrounding of each antinode of the electromagnetic wave to a larger extent. Here, the degree of deterioration of the NOx catalyst is not necessarily uniform inside the NOx catalyst. In the NOx catalyst, the temperature of the NOx catalyst goes up more readily in its upstream portion than in its downstream portion, the progress of deterioration of the NOx catalyst is more rapid in the upstream portion than in the downstream portion. In addition, when ammonia is supplied to the NOx catalyst, the amount of adsorption of ammonia increases from the upstream portion of the NOx catalyst toward the downstream portion thereof in a successive manner. Accordingly, if the ammonia detection sensitivity of the upstream portion which deteriorates more easily in the NOx catalyst is made high, a decrease in the amount of adsorbed ammonia due to the deterioration of the NOx catalyst can be detected at an earlier stage. Then, in cases where the abnormality diagnosis of the NOx catalyst is carried out based on the resonance frequency, if the NOx catalyst is arranged in such a manner that the electric field strength becomes larger in the upstream portion of the NOx catalyst than in the downstream portion thereof, ammonia detection sensitivity in the upstream portion of the NOx catalyst can be made larger than that in the downstream portion thereof. Here, note that there may be a plurality of resonance frequencies. In this case, electric field distribution varies for each resonance frequency, so the locations at which ammonia detection sensitivity is high vary with each resonance frequency. In this case, a resonance frequency with its antinodes existing in the upstream portion of the NOx catalyst is selected.

In addition, at the time of the abnormality diagnosis of the NOx catalyst, the amount of adsorbed ammonia in a state where ammonia is saturated is detected based on the resonance frequency, and the abnormality diagnosis of the NOx catalyst may be carried out based on this amount of adsorbed ammonia. In this case, when ammonia is supplied to the NOx catalyst so that the ammonia is saturated in the NOx catalyst as a whole, there is a fear that the ammonia may slip from the NOx catalyst. On the other hand, when ammonia is supplied to the NOx catalyst so that the ammonia is saturated only in the upstream portion of the NOx catalyst, the ammonia having slipped from the upstream portion of the NOx catalyst can be made to be adsorbed in the downstream portion of the NOx catalyst. Accordingly, it is possible to suppress the ammonia from slipping from the NOx catalyst. Then, when the electric field strength is made large in the upstream portion of the NOx catalyst, a decrease in the amount of adsorbed ammonia in the upstream portion can be detected at an early stage. At this time, ammonia is not adsorbed in the downstream portion of the NOx catalyst, but ammonia detection sensitivity is low in the downstream portion, so the influence on the resonance frequency is small. For that reason, it is possible to suppress a reduction in the accuracy of the abnormality determination.

Said NOx selective catalytic reduction catalyst may be constructed in such a manner that there exists only one location within said NOx selective catalytic reduction catalyst at which the electric field strength inside said NOx selective catalytic reduction catalyst at the time when said irradiation device irradiates the electromagnetic wave of the resonance frequency becomes the largest, and that the location at which said electric field strength becomes the largest is located in said upstream portion.

By constructing the NOx catalyst such that only one antinode of the electromagnetic wave exists in the upstream portion of the NOx catalyst, the resonance frequency according to the amount of adsorbed ammonia in the upstream portion of the NOx catalyst can be obtained with a higher degree of accuracy. If an antinode of the electromagnetic wave exists in the downstream portion of the NOx catalyst, the resonance frequency detected will be affected by the influence of the amount of adsorbed ammonia in the downstream portion of the NOx catalyst. In this case, it is necessary for ammonia to be saturated in the downstream portion, too, so there is a fear that ammonia may slip from the NOx catalyst. Accordingly, by constructing the NOx catalyst such that only one location at which the electric field strength inside the NOx catalyst becomes the largest exists in the NOx catalyst, and that the location at which the electric field strength becomes the largest is located in the upstream portion, it is possible to improve accuracy in the abnormality diagnosis of the NOx catalyst, while suppressing ammonia from slipping from the NOx catalyst.

Provision may be further made for an addition valve configured to supply ammonia to said NOx selective catalytic reduction catalyst, wherein said controller may carry out the abnormality diagnosis of said NOx selective catalytic reduction catalyst based on the resonance frequency detected by said irradiation device, in a state where the ammonia supplied by said addition valve is saturated in said upstream portion.

Because the antinode of the electromagnetic wave is in the upstream portion of the NOx catalyst, the abnormality diagnosis of the NOx catalyst can be carried out by making ammonia saturated in the upstream portion of the NOx catalyst. In this case, ammonia is supplied in such a manner as not to be saturated in the downstream portion of the NOx catalyst. In that case, the ammonia having slipped from the upstream portion of the NOx catalyst can be made to be adsorbed in the downstream portion, so it is possible to suppress the ammonia from slipping from the NOx catalyst.

Said NOx selective catalytic reduction catalyst may be received in a case, wherein said NOx selective catalytic reduction catalyst may have its center shifted from a center of said case to an upstream side in the direction of flow of exhaust gas.

When the center of the NOx catalyst is shifted from the center of the case to the upstream side in the direction of flow of exhaust gas, there can be formed a space where the NOx catalyst does not exist inside the case at the downstream side of the NOx catalyst. Thus, by arranging the NOx catalyst in this manner, the electric field strength in the upstream portion of the NOx catalyst can be more easily made larger than in the downstream portion of the NOx catalyst.

According to the present disclosure, an abnormality diagnosis of an NOx catalyst can be carried out, while suppressing ammonia from flowing out from the NOx catalyst.

DESCRIPTION OF THE EMBODIMENTS

Hereinafter, modes for carrying out the present disclosure will be described in detail by way of example based on preferred embodiments thereof with reference to the attached drawings. However, the dimensions, materials, shapes, relative arrangements and so on of component parts described in the embodiments are not intended to limit the scope of the present disclosure to these alone in particular as long as there are no specific statements.

First Embodiment

Figure 1:
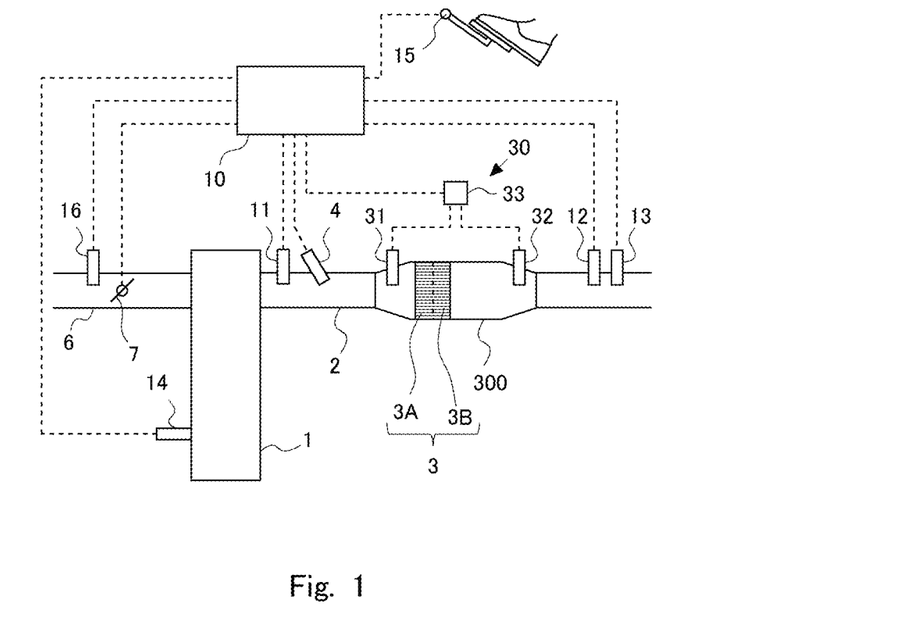
FIG. 1 is a view showing the schematic construction of an internal combustion engine with its intake system and exhaust system according to a first embodiment of the present disclosure.

FIG. 1 is a view showing the schematic construction of an internal combustion engine 1 with its intake and exhaust systems according to a first embodiment of the present disclosure. The internal combustion engine 1 is a diesel engine for driving a vehicle. However, the internal combustion engine 1 may be a gasoline engine. An exhaust passage 2 is connected to the internal combustion engine 1. In the exhaust passage 2, there is arranged an NOx selective catalytic reduction catalyst 3 (hereinafter, referred to as an "NOx catalyst 3") which serves to selectively reduce NOx in an exhaust gas with the use of ammonia as a reducing agent. The NOx catalyst 3 is received in a case 300 made of metal. Hereinafter, in the NOx catalyst 3, a portion thereof at the upstream side of the center of the NOx catalyst 3 in the direction of flow of the exhaust gas is referred to as an upstream portion 3A, and a portion of the NOx catalyst 3 at the downstream side of the center thereof is referred to as a downstream portion 3B. A broken line in FIG. 1 is a line which indicates the center of the NOx catalyst 3 in the direction of flow of the exhaust gas, and is also a line which becomes a boundary between the upstream side portion 3A and the downstream side portion 3B.

On the exhaust passage 2 at the upstream side of the NOx catalyst 3, there is mounted an addition valve 4 for injecting urea water into the exhaust gas. The urea water is a precursor of ammonia (NH3). The urea water injected from the addition valve 4 is hydrolyzed into ammonia by the heat of the exhaust gas or the heat from the NOx catalyst 3, and the ammonia thus generated is adsorbed to the NOx catalyst 3. This ammonia is used as the reducing agent in the NOx catalyst 3. Here, note that the addition valve 4 may inject ammonia in place of the urea water. In this embodiment, the addition valve 4 corresponds to an addition valve in the present disclosure.

On the exhaust passage 2 at the upstream side of the addition valve 4, there is mounted an upstream side NOx sensor 11 for detecting NOx in the exhaust gas flowing into the NOx catalyst 3. Also, on the exhaust passage 2 at the downstream side of the NOx catalyst 3, there are mounted a downstream side NOx sensor 12 for detecting NOx in the exhaust gas flowing out of the NOx catalyst 3 and a temperature sensor 13 for detecting the temperature of the exhaust gas. Here, note that the temperature sensor 13 may be mounted on the NOx catalyst 3 so as to detect the temperature of the NOx catalyst 3.

In addition, an irradiation device 30 for irradiating an electromagnetic wave (microwave) to the NOx catalyst 3 is mounted on the exhaust passage 2. The irradiation device 30 includes a first probe 31 mounted on the exhaust passage 2 at the upstream side of the NOx catalyst 3, a second probe 32 mounted on the exhaust passage 2 at the downstream side of the NOx catalyst 3, and a frequency control device 33. The first probe 31 and the second probe 32 are rod antennas, and are respectively connected to the frequency control device 33. The frequency control device 33 has the functions of an oscillator and a receiver which serve to generate an electromagnetic wave (microwave) between the first probe 31 and the second probe 32, and further has the function of obtaining a resonance frequency, an oscillation electric power, and a reception electric power by changing the frequency of this microwave. Here, note that in this embodiment, the NOx catalyst 3 is irradiated with the microwave by using the rod antennas, but instead of this, the NOx catalyst 3 may be irradiated with the microwave by using a wave guide. In this embodiment, the irradiation device 30 corresponds to an irradiation device in the present disclosure.

Moreover, an intake passage 6 is connected to the internal combustion engine 1. A throttle valve 7 for regulating an amount of intake air to be supplied to the internal combustion engine 1 is arranged in the middle of the intake passage 6. Also, an air flow meter 16 for detecting the amount of intake air in the internal combustion engine 1 is mounted on the intake passage 6 at a location upstream of the throttle valve 7.

Then, an ECU 10, which is an electronic control unit, is provided in combination with the internal combustion engine 1. The ECU 10 is constructed as a digital computer which is of well-known construction having a read-only memory (ROM), a random-access memory (RAM), a microprocessor (CPU), input and output ports, etc. A plurality of programs are stored in the ROM of the ECU 10, so that the ECU 10 controls the operating state of the internal combustion engine 1, the exhaust gas purification apparatus, etc., by executing predetermined programs. A crank position sensor 14 and an accelerator opening sensor 15 in addition to the temperature sensor 13, the air flow meter 16, etc., as mentioned above are electrically connected to the ECU 10, and the output values of these individual sensors are passed or transmitted to the ECU 10.

The ECU 10 is able to grasp the operating state of the internal combustion engine 1, such as an engine rotational speed based on the detection of the crank position sensor 14, an engine load based on the detection of the accelerator opening sensor 15, etc. In addition, the ECU 10 is able to estimate the temperature of the NOx catalyst 3 based on the temperature of the exhaust gas detected by the temperature sensor 13. Here, note that the temperature sensor 13 may be a sensor that detects the temperature of the NOx catalyst 3. Moreover, it is also possible to estimate the temperature of the NOx catalyst 3 based on the operating state of the internal combustion engine 1. On the other hand, the addition valve 4, the throttle valve 7 and the frequency control device 33 are connected to the ECU 10 through electrical wiring, so that these parts are controlled by means of the ECU 10.

Figure 2:
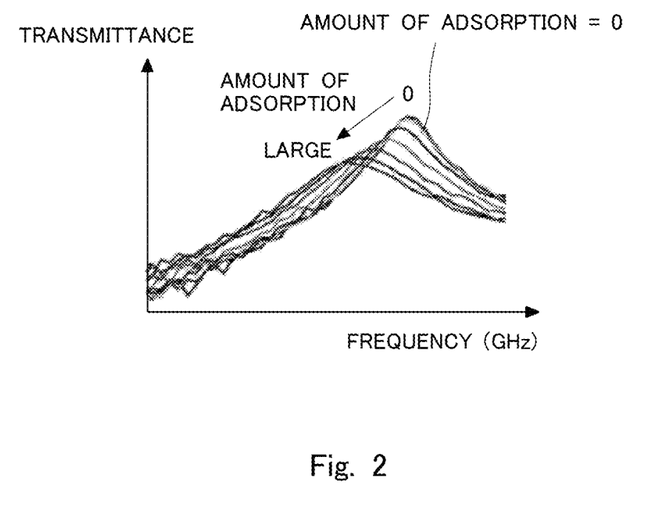
FIG. 2 is a view showing the relation between the frequency and the transmittance of a microwave transmitted by an irradiation device.

The ECU 10 detects the amount of ammonia adsorbed to the NOx catalyst 3 based on the resonance frequency detected at the time when the irradiation device 30 irradiates the microwave to the NOx catalyst 3. Here, the resonance frequency detected at the time when the microwave is generated by the frequency control device 33 and when the frequency of the microwave is further changed has a correlation with the amount of adsorption of ammonia in the NOx catalyst 3. FIG. 2 is a view showing the relation between the frequency of the microwave and the transmittance of the microwave oscillated by the irradiation device 30. The transmittance is a ratio of the reception electric power with respect to the oscillation electric power at the time when the microwave is generated between the first probe 31 and the second probe 32. A plurality of lines shown in FIG. 2 show the cases where the amounts of adsorbed ammonia are different from one another, respectively. A frequency at which the transmittance becomes the highest in each line is the resonance frequency. A line indicated by "the amount of adsorption=0" shows a relation in the case where the amount of adsorbed ammonia in the NOx catalyst 3 is 0, and the resonance frequency becomes the highest in the case where this amount of adsorbed ammonia is 0. Then, the resonance frequency becomes lower as the amount of adsorbed ammonia increases. Here, ammonia includes permanent dipoles, and the direction of each permanent dipole changes according to electric field. The permanent dipoles of the ammonia adsorbed to the NOx catalyst 3 follow a change in the electric field of the microwave with a time lag, so that the resonance frequency shifts to a lower frequency side under the influence of an increase in the amount of adsorbed ammonia on electromagnetic field. In addition, the more the amount of adsorption of ammonia, the larger the loss of energy due to dielectric heating becomes, and hence the lower the transmittance becomes.

Figure 3:
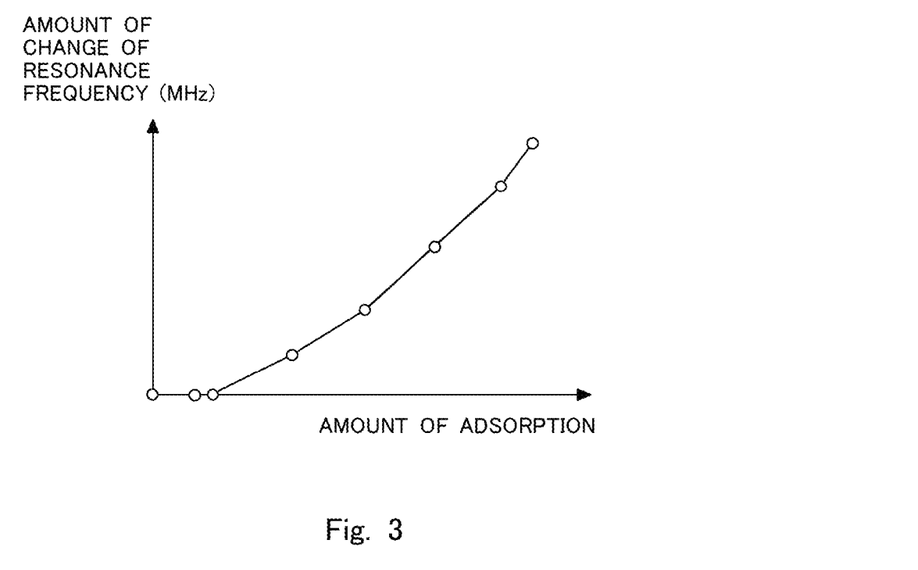
FIG. 3 is a view showing the relation between the amount of adsorbed ammonia and the amount of change in a resonance frequency.

FIG. 3 is a view showing the relation between the amount of adsorbed ammonia and an amount of change of the resonance frequency. The amount of change of the resonance frequency is an amount of change thereof from a reference value when the resonance frequency in the case of the amount of adsorbed ammonia being 0 is taken as the reference value. It is found that when the amount of adsorbed ammonia is in the vicinity of 0, the amount of change of the resonance frequency becomes 0, but when the amount of adsorbed ammonia has increased to some extent, the amount of change of the resonance frequency becomes larger as the amount of adsorbed ammonia further increases. Accordingly, it can be said that in a range where when the amount of change of the resonance frequency becomes larger as the amount of adsorbed ammonia increases, the amount of adsorbed ammonia and the resonance frequency are in correlation with each other. Here, note that a range where the amount of adsorbed ammonia in which the amount of change of the resonance frequency is 0 can be diminished by adjusting the position and shape of the NOx catalyst 3. Accordingly, the NOx catalyst 3 may be formed in such a manner that the range where the amount of change of the resonance frequency is 0 becomes small. Then, if the relation between the amount of adsorbed ammonia and the resonance frequency has been obtained in advance by experiments, simulations or the like, the amount of desorbed ammonia can be obtained based on the resonance frequency. In this manner, the irradiation device 30 detects the amount of adsorbed ammonia based on the resonance frequency. Here, note that the influence of the change of the resonance frequency due to the individual difference of the NOx catalyst 3 can be eliminated by obtaining the amount of adsorbed ammonia based on the amount of change of the resonance frequency, as shown in FIG. 3, but if the relation between the resonance frequency and the amount of adsorbed ammonia has been obtained in advance, the amount of adsorbed ammonia can be obtained based on the resonance frequency. This relation has been obtained at each temperature of the NOx catalyst 3. Accordingly, in this embodiment, the amount of adsorbed ammonia can be obtained based on the resonance frequency.

Here, the distribution of the electric field in the NOx catalyst 3 changes according to the change of the resonance frequency. At this time, in cases where the amount of adsorbed ammonia is detected, the influence of the amount of adsorbed ammonia becomes large in an antinode of the microwave, whereas the influence of the amount of adsorbed ammonia becomes smaller as it comes closer to a node of the microwave. Thus, ammonia detection sensitivity becomes the highest in the antinode of the microwave.

The temperature of the NOx catalyst 3 becomes the highest in the vicinity of an upstream side end portion thereof, and hence, when it is considered that the NOx catalyst 3 is divided into the upstream portion 3A and the downstream portion 3B, the progress of deterioration thereof is more rapid in the upstream portion 3A than in the downstream portion 3B. Accordingly, in the case of carrying out the abnormality diagnosis of the NOx catalyst 3, the deterioration of the upstream portion 3A need only be detected. Then, by arranging the NOx catalyst 3, the case 300 and the irradiation device 30 in such a manner that an antinode of the microwave may be located in the upstream portion 3A, ammonia detection sensitivity in the upstream portion 3A can be more enhanced. As a result of this, it is possible to improve the accuracy of the abnormality diagnosis of the NOx catalyst 3.

In the past, in cases where the abnormality diagnosis of the NOx catalyst 3 was carried out, ammonia was sometimes supplied to the NOx catalyst 3 until ammonia was saturated in the entire NOx catalyst 3. However, when ammonia is saturated in the entire NOx catalyst 3, ammonia will slip easily from the NOx catalyst 3. Accordingly, in the abnormality diagnosis of the NOx catalyst 3 according to this embodiment, ammonia is kept from being saturated in the downstream portion 3B of the NOx catalyst 3, by supplying ammonia until ammonia is saturated in the upstream portion 3A of the NOx catalyst 3. Here, when ammonia is supplied to the NOx catalyst 3 from the addition valve 4, the ammonia is adsorbed to the NOx catalyst 3 from an upstream end face thereof toward a downstream side thereof. Accordingly, if the supply of ammonia is ended at the time when ammonia has been supplied from the addition valve 4 until the ammonia is saturated in the upstream portion 3A of the NOx catalyst 3, it will be in a state where ammonia is saturated in the upstream portion 3A but not saturated in the downstream portion 3B. In that case, even if ammonia slips from the upstream portion 3A, it can be adsorbed in the downstream portion 3B, so it is possible to suppress the ammonia from slipping from the NOx catalyst 3. In addition, in the downstream portion 3B, detection sensitivity at the time of detecting the amount of adsorbed ammonia is low due to the change of the resonance frequency of the microwave, so even if ammonia is not saturated, its influence on the change of the resonance frequency is small.

Figure 4:
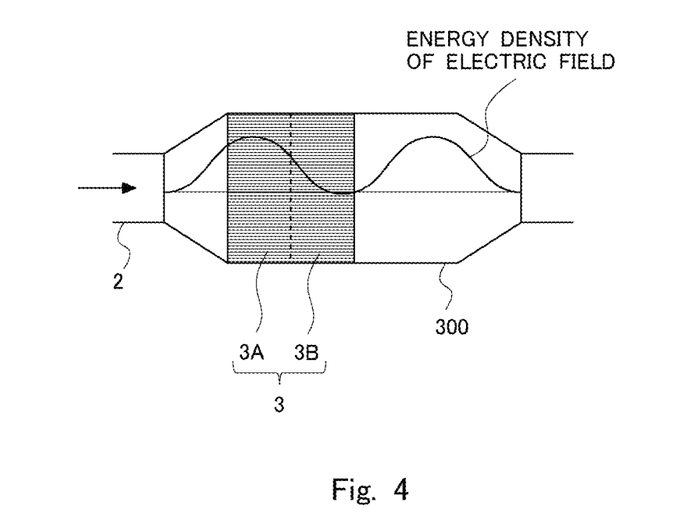
FIG. 4 is a view showing the relation between the position of an NOx catalyst inside a case and the energy density of an electric field.

FIG. 4 is a view showing the relation between the position of the NOx catalyst 3 inside the case 300 and the energy density of the electric field. In FIG. 4, exhaust gas flows in the direction of an arrow. The energy density of the electric field is substantially equal to the ammonia detection sensitivity. As shown in FIG. 4, the position and the size of the NOx catalyst 3, the capacity of the case 300, and the frequency band of the electromagnetic wave have been adjusted in advance by carrying out experiments, simulations, or the like, in such a manner that only one antinode of the microwave is located in the upstream portion 3A of the NOx catalyst 3 inside the case 300, and two or more antinodes of the microwave are not located in the NOx catalyst 3 (i.e., in the interior of the NOx catalyst 3, there exists only one location at which the electric field strength inside the NOx catalyst 3 becomes the largest, and the location at which the electric field strength becomes the largest is located in the upstream portion 3A). In this case, it can be said that the NOx catalyst 3 is arranged at such a location that the electric field strength becomes larger in the upstream portion 3A of the NOx catalyst 3 than in the downstream portion 3B thereof. For that reason, a space is formed at the downstream side of the location at which the NOx catalyst 3 inside the case 300 is arranged. That is, the center of the NOx catalyst 3 is shifted to the upstream side of the center of the case 300 in the direction of flow of exhaust gas. In the case of assuming that no space is formed inside the case 300 at the downstream side of the NOx catalyst 3, it will become difficult to construct the NOx catalyst 3 such that only one antinode of the microwave is located in the upstream portion 3A, and two or more antinodes of the microwave are not located in the NOx catalyst 3. In this embodiment, by forming such a space, it can be easily constructed so that only one antinode of the microwave is located in the upstream portion 3A, and two or more antinodes of the microwave are not located in the NOx catalyst 3.

Figure 5:
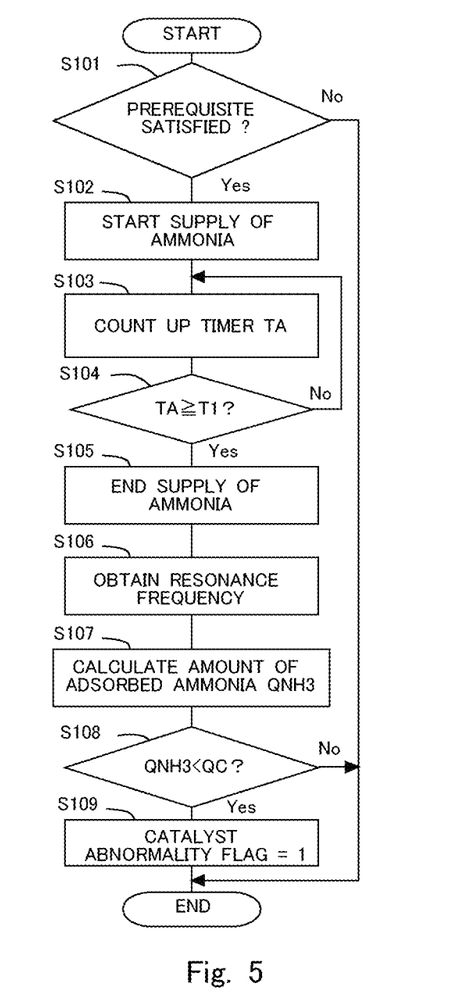
FIG. 5 is a flow chart showing a flow of abnormality diagnosis control according to the first embodiment.

Next, reference will be made to a flow or routine of abnormality diagnosis control according to this embodiment. FIG. 5 is a flow chart showing the flow or routine of abnormality diagnosis control according to this embodiment. By executing programs at a predetermined interval, the ECU 10 carries out the abnormality diagnosis control at the predetermined interval. Here, note that before carrying out this flow chart, the ECU 10 may confirm by a well-known technique that there is no abnormality in any of those devices (e.g., the addition valve 4) other than the NOx catalyst 3.

In step S101, the ECU 10 determines whether a prerequisite or precondition for performing the abnormality diagnosis of the NOx catalyst 3 is satisfied. Here, when the temperature of the NOx catalyst 3 becomes high, ammonia will desorb from the NOx catalyst 3, and hence, abnormality determination has to be carried out in a state where the amount of adsorbed ammonia is small, so that the influence of an error becomes large. For this reason, there is a fear that the accuracy of the abnormality determination may become low. Accordingly, a diagnosable temperature is set as an upper limit of temperatures at which required diagnostic accuracy can be obtained. When the temperature of the NOx catalyst 3 is equal to or lower than the diagnosable temperature, the ECU 10 makes a determination that the prerequisite is satisfied. Here, note that an operating state of the internal combustion engine 1 in which the prerequisite is satisfied has been obtained in advance by experiments, simulations or the like, and when the internal combustion engine 1 is in this operating state, a determination may be made that the prerequisite is satisfied. In cases where an affirmative determination is made in step S101, the routine of the flow chart goes to step S102, whereas in cases where a negative determination is made, this abnormality diagnosis control is ended.

In step S102, the supply of ammonia is started. Then, in step S103, the ECU 10 counts up a timer TA which serves to count the time of supply of ammonia. Here, note that this timer TA is reset to 0 at the time of the start or end of the flow chart. In step S104, the ECU 10 determines whether the timer TA is equal to or more than a predetermined period of time T1. The predetermined period of time T1 is set as a period of time required to supply a sufficient amount of ammonia to the upstream portion 3A of the NOx catalyst 3, in order to carry out the abnormality diagnosis of the NOx catalyst 3 with a desired accuracy. That is, in the abnormality diagnosis of the NOx catalyst 3, it is necessary for ammonia to be saturated in the upstream portion 3A of the NOx catalyst 3, and hence, ammonia is supplied until it is saturated in the upstream portion 3A of the NOx catalyst 3. Accordingly, the predetermined period of time T1 is set so that ammonia is saturated in the upstream portion 3A of the NOx catalyst 3. This predetermined period of time T1 may be changed according to the amount of adsorbed ammonia in the upstream portion 3A of the NOx catalyst 3 at the time when the supply of ammonia is started in step S102. The amount of adsorbed ammonia in the upstream portion 3A of the NOx catalyst 3 can be estimated by the ECU 10 with the use of a well-known technique. In this case, the amount of adsorbed ammonia is estimated, by assuming the upstream portion 3A of the NOx catalyst 3 to be one NOx catalyst. In addition, when the temperature of the NOx catalyst 3 becomes sufficiently high, the amount of adsorption of ammonia in the NOx catalyst 3 becomes zero. Thereafter, if the supply of ammonia is started when the temperature of the NOx catalyst 3 drops equal to or less than the diagnosable temperature, ammonia can be supplied from a state in which the amount of adsorbed ammonia in the upstream portion 3A of the NOx catalyst 3 is 0, as a result of which it is not necessary to estimate the amount of adsorption of ammonia as mentioned above. In addition, because the amount of ammonia which can be adsorbed to the NOx catalyst 3 becomes smaller as the temperature of the NOx catalyst 3 becomes higher, the predetermined period of time T1 may be changed according to the temperature of the NOx catalyst 3.

Here, note that in this flow chart of FIG. 5, the time to end the supply of ammonia is determined based on the time of supply of ammonia, but instead of this, the time to end the supply of ammonia may be determined based on the amount of supply of ammonia. In addition, when the amount of adsorbed ammonia in the upstream portion 3A of the NOx catalyst 3 becomes equal to or more than an amount of ammonia which can be adsorbed at the time of assuming the NOx catalyst 3 to be abnormal, the supply of ammonia may be ended. In this case, when the NOx catalyst 3 is normal, ammonia will not be saturated in the NOx catalyst 3, whereas when abnormal, ammonia will be saturated in the NOx catalyst 3. For this reason, a difference occurs in the amount of adsorbed ammonia between the case where the NOx catalyst 3 is normal and the case where it is abnormal, so it is possible to perform the abnormality diagnosis according to the amount of adsorbed ammonia. Moreover, when the amount of adsorbed ammonia in the upstream portion 3A of the NOx catalyst 3 becomes equal to or more than the amount of ammonia which can be adsorbed at the time of assuming the NOx catalyst 3 to be normal, the supply of ammonia may be ended. In this case, ammonia slips from the upstream portion 3A, but the ammonia thus slipped can be adsorbed in the downstream portion 3B. In cases where an affirmative determination is made in step S104, the routine goes to step S105, whereas in cases where a negative determination is made, the routine returns to step S103. Then, in step S105, the ECU 10 ends the supply of ammonia.

In step S106, the irradiation device 30 irradiates a microwave to the NOx catalyst 3, and detects the resonance frequency thereof, whereby the ECU 10 obtains this resonance frequency. The resonance frequency is stored in the RAM of the ECU 10. In step S107, the ECU 10 calculates an amount of adsorbed ammonia QNH3 from the resonance frequency obtained in step S106. The ECU 10 has stored in the RAM a plurality of maps according to temperatures, by which the amount of adsorbed ammonia QNH3 is obtained from the resonance frequency. These maps have been obtained in advance through experiments, simulations, or the like.

In step S108, it is determined whether the amount of adsorbed ammonia QNH3 calculated in step S107 is smaller than a threshold value QC. The threshold value QC has been obtained in advance as an amount of adsorbed ammonia at the time when the NOx catalyst 3 is normal at each temperature of the NOx catalyst 3 by experiments, simulations or the like. The amount of adsorbed ammonia changes according to the temperature of the NOx catalyst 3, so the threshold value QC is changed according to the temperature of the NOx catalyst 3. In cases where an affirmative determination is made in step S108, the routine goes to step S109, in which a catalyst abnormality flag is set to 1. The catalyst abnormality flag is a flag which is set to 1 in cases where the NOx catalyst 3 is abnormal, and which is set to 0 in cases where the NOx catalyst 3 is normal. An initial value of the catalyst abnormality flag is 0. When the catalyst abnormality flag becomes 1, the ECU 10 diagnoses that the NOx catalyst 3 is abnormal. On the other hand, in cases where a negative determination is made in step S108, the ECU 10 ends this abnormality diagnosis control. At this time, the catalyst abnormality flag becomes 0, so the ECU 10 diagnoses that the NOx catalyst 3 is normal. Here, note that the ECU 10 functions as a controller in the present disclosure, by carrying out the processings in step S108 and in step S109.

As described above, according to this embodiment, by constructing the NOx catalyst 3 in such a manner that an antinode of a microwave may be located in the upstream portion 3A of the NOx catalyst 3, the abnormality diagnosis of the NOx catalyst 3 can be carried out based on the resonance frequency detected at the time when the NOx catalyst 3 is irradiated with the microwave. In addition, ammonia need not be saturated in the entire NOx catalyst 3, so it is possible to suppress the ammonia from flowing out of the NOx catalyst 3 at the time of carrying out the abnormality diagnosis. As a result of this, it is also possible to decrease the amount of consumption of ammonia. Moreover, in the case of assuming that the electric field strength is larger in the downstream portion 3B than in the upstream portion 3A, even if the deterioration of the NOx catalyst 3 progresses in the upstream portion 3A, the change of the resonance frequency becomes small, thus making it difficult to perform the abnormality diagnosis with high accuracy. On the other hand, according to this embodiment, when the deterioration of the upstream portion 3A progresses, the NOx catalyst 3 is diagnosed as abnormal, so that the abnormality of the NOx catalyst 3 can be detected at an early stage.

Second Embodiment

Figure 6:
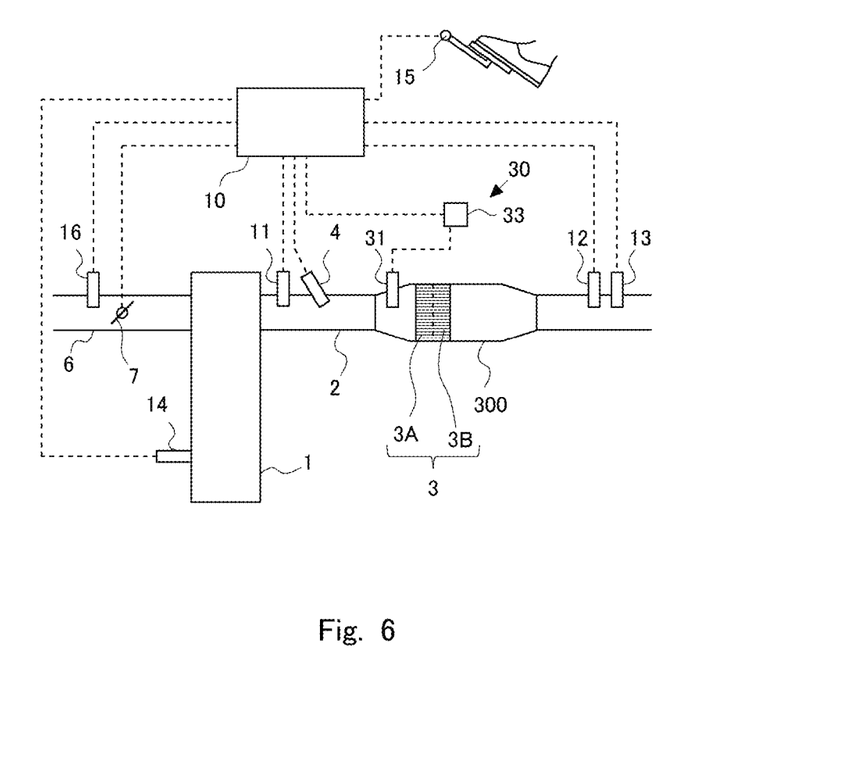
FIG. 6 is a view showing the schematic construction of an internal combustion engine with its intake system and exhaust system according to a second embodiment of the present disclosure.

FIG. 6 is a view showing the schematic construction of an internal combustion engine 1 with its intake and exhaust systems according to a second embodiment of the present disclosure. Differences of this second embodiment from the above-mentioned first embodiment will be mainly explained below. The irradiation device 30 for irradiating a microwave to the NOx catalyst 3 is mounted on the exhaust passage 2. The irradiation device 30 includes the first probe 31 mounted on the exhaust passage 2 at the upstream side of the NOx catalyst 3, and the frequency control device 33. That is, the second probe 32 is not included in this second embodiment. The first probe 31 irradiates the microwave to the NOx catalyst 3, and receives the microwave reflected therefrom. Similar to the first embodiment, the frequency control device 33 can obtain a resonance frequency, an oscillation electric power, and a reception electric power by changing the frequency of the microwave. In this second embodiment, the irradiation device 30 corresponds to an irradiation device in the present disclosure.

In this second embodiment, too, similar to the first embodiment, the position and the size of the NOx catalyst 3, the capacity of the case 300, and the frequency band of the electromagnetic wave have been adjusted in advance by carrying out experiments, simulations or the like, in such a manner that an antinode of the microwave is located in the upstream portion 3A of the NOx catalyst 3, and two or more antinodes of the microwave are not located in the NOx catalyst 3.

In the irradiation device 30 according to the second embodiment, the detection accuracy of the resonance frequency becomes lower because of the non-inclusion of the second probe 32, but on the other hand, a space in which the second probe 32 is arranged is unnecessary, and hence, the arrangement of the irradiation device 30 becomes easy. The other control, effects and so on in this second embodiment are the same as those in the first embodiment, so the explanation thereof is omitted.

What is claimed is:

1. An abnormality diagnosis apparatus for an NOx selective catalytic reduction catalyst which is arranged in an exhaust passage of an internal combustion engine and selectively reduces NOx by using ammonia, said apparatus comprising:
   an irradiation device configured to irradiate an electromagnetic wave to said NOx selective catalytic reduction catalyst, and detect a resonance frequency; and
   a controller configured to diagnose based on said resonance frequency whether said NOx selective catalytic reduction catalyst is abnormal;
   wherein said NOx selective catalytic reduction catalyst is arranged in such a position that an electric field strength inside said NOx selective catalytic reduction catalyst at the time when said irradiation device irradiates the electromagnetic wave of the resonance frequency becomes larger in an upstream portion of said NOx selective catalytic reduction catalyst, which is at the upstream side of a center of said NOx selective catalytic reduction catalyst in the direction of flow of exhaust gas, than in a downstream portion of said NOx selective catalytic reduction catalyst, which is at the downstream side of the center of said NOx selective catalytic reduction catalyst.

2. The abnormality diagnosis apparatus as set forth in claim 1, wherein
   said NOx selective catalytic reduction catalyst is constructed in such a manner that there exists only one location within said NOx selective catalytic reduction catalyst at which the electric field strength inside said NOx selective catalytic reduction catalyst at the time when said irradiation device irradiates the electromagnetic wave of the resonance frequency becomes the largest, and that the location at which said electric field strength becomes the largest is located in said upstream portion.

3. The abnormality diagnosis apparatus as set forth in claim 1, further comprising:
   an addition valve configured to supply ammonia to said NOx selective catalytic reduction catalyst;
   wherein said controller is further configured to carry out the abnormality diagnosis of said NOx selective catalytic reduction catalyst based on the resonance frequency detected by said irradiation device, in a state where the ammonia supplied by said addition valve is saturated in said upstream side portion.

4. The abnormality diagnosis apparatus as set forth in claim 1, wherein
   said NOx selective catalytic reduction catalyst is received in a case; and
   said NOx selective catalytic reduction catalyst has its center shifted from a center of said case to the upstream side in the direction of flow of exhaust gas.

* * * * *